A. C. GILBERT.
ELECTRIC MOTOR.
APPLICATION FILED MAR. 8, 1919.
1,381,986.
Patented June 21, 1921.
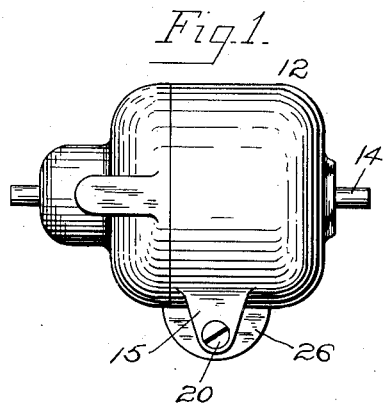
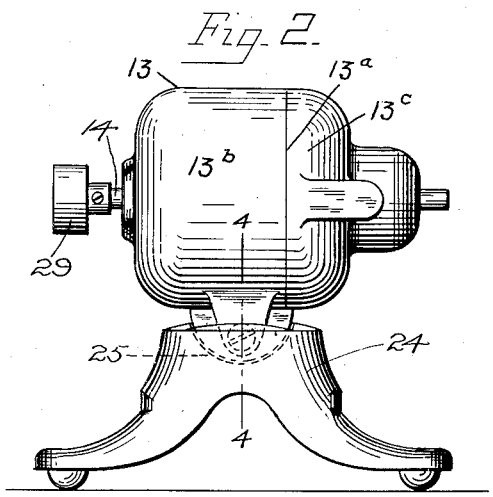
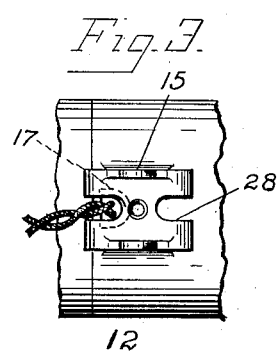
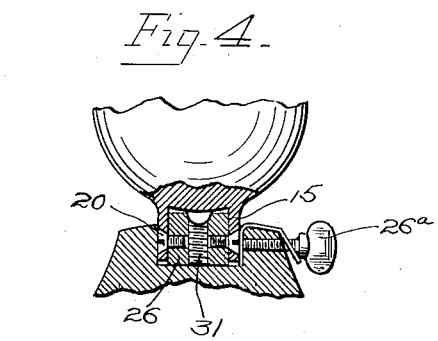
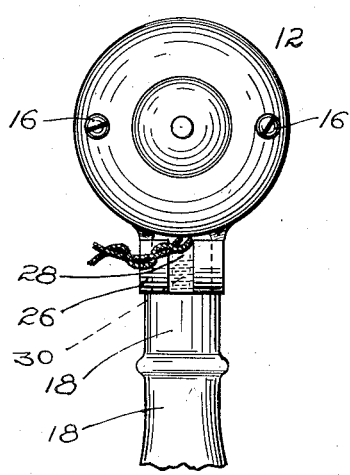
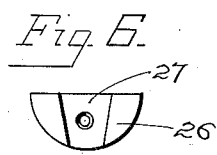
Inventor
Alfred C. Gilbert
Henry E. Rockwell
By
Attorney

UNITED STATES PATENT OFFICE.

ALFRED C. GILBERT, OF NEW HAVEN, CONNECTICUT, ASSIGNOR TO THE A. C. GILBERT COMPANY, OF NEW HAVEN, CONNECTICUT, A CORPORATION OF CONNECTICUT.

ELECTRIC MOTOR.

1,381,986.   Specification of Letters Patent.   Patented June 21, 1921.

Original application filed November 26, 1917, Serial No. 203,975. Divided and this application filed March 8, 1919. Serial No. 281,329.

*To all whom it may concern:*

Be it known that I, ALFRED C. GILBERT, a citizen of the United States, residing in the city and county of New Haven and State of Connecticut, have invented certain new and useful Improvements in Electric Motors, of which the following is a full, clear, and exact description.

This invention, which is a division of my copending application, Serial No. 203,975, filed November 26, 1917, relates to electric motors, and more particularly to small, portable electric motors for home use.

One of the primary objects of my invention is the production of an electric motor construction in which the motor member or motor proper comprising the motor casing, field, armature and motor shaft is adapted to a large variety of uses, such as driving a fan, operating a sewing machine, mixing or agitating liquids, etc. When employed for some of these purposes, for example as a sewing machine motor, the motor member is mounted on a base member that rests upon the table of the sewing machine, whereas, when the motor is used as a drink mixer or as a vibratory massage implement, the motor member is removed from the aforesaid base and equipped with a laterally extending handle member by means of which it may be very readily manipulated.

More specifically, my object is to provide an electric motor construction in which the motor member or motor proper, as distinguished from the device for supporting or manipulating it, is so constructed and arranged that the conversion of the device from one function to another can be very readily effected.

Another object of the invention is to provide an electric motor casing with means whereby it may be very readily secured either to a supporting base or to an operating handle.

Another object of the invention is to provide a motor in which the casing is furnished with an improved form of lug for supporting it pivotally on a suitable base.

To these and other ends, the invention consists in the novel features and combinations of parts to be hereinafter described and claimed.

In the accompanying drawing:

Figure 1 is a side elevation of an electric motor embodying my improvements, showing a block mounted between the spaced lugs upon the motor casing.

Fig. 2 is a side elevation of the motor as arranged for driving a sewing machine or the like, the block between the casing lugs serving to support the motor member pivotally on a base member.

Fig. 3 is a bottom view of the parts shown in Fig. 1.

Fig. 4 is a section taken on line 4—4 of Fig. 2.

Fig. 5 is an end view of the motor member, showing a further arrangement of parts wherein a handle is secured to the motor member by means of the block between the lugs; and Fig. 6 is a detail side elevation of the block.

The motor member 12, which may be of any approved type, comprises a casing 13 generally cylindrical in shape, and a motor shaft 14 extending through the casing. It will be understood, of course, that this motor shaft is fixed to the usual armature (not shown) and that the armature revolves between suitable field windings (not shown) constructed and arranged in the case in the usual or any preferred manner. In the particular example illustrated, the casing 13 is divided transversely along a line $13^a$, so as to form separate sections $13^b$, $13^c$. The brushes (not shown) may be carried by the section $13^c$. Preferably the motor shaft, which is journaled in the bearings in the respective sections $13^b$, $13^c$, extends out at each end to an appreciable distance beyond the outer face of the corresponding section, so that a pulley or other device may be attached to either end of the shaft. At one part of its periphery, the casing 13 is provided with a pair of lugs 15. These preferably are formed integrally with the casing, and in the present instance they are formed on the section $13^b$, which is the larger of the two casing sections, said lugs being located at substantially the center of the motor casing but at the lower part thereof, as shown in Fig. 1. The two casing sections are secured together by means of screws 16. An opening 17 is formed in the section $13^b$ at its inner edge between the lugs 15, as shown in dotted lines in Fig. 3, and this opening serves for the passage of the usual electric conductors which extend therethrough into the case, where connection is made with the motor parts.

The lugs 15 serve in mounting the motor member 12 on a suitable base, such as the base member 24 shown in Fig. 2. This base member has a socket 25 at the upper portion thereof with a curved bottom and the motor member has a correspondingly shaped projection or lug entering said socket. The socket and lug are so shaped as to permit tilting movement of the motor member relatively to the base member in the plane of the motor shaft 14. When the parts have been properly adjusted, the motor member may be clamped to the base by a clamping screw 26ª, substantially as described in my companion application, Serial No. 203,974, filed Nov. 26, 1917. In accordance with the present invention, the lug on the motor member which engages the socket of the base consists partly of the casing lugs 15 integral with the casing member and partly of an interposed lug or supporting block 26, which is secured between lugs 15 by screws 20. The block or supporting member 26 is cut away at the sides to form lug-receiving grooves 27, in which the lugs fit in such a manner that the outer faces of said lugs 15 are substantially flush with the outer side faces of the block. It is understood, of course, that the screws 20 enter tapped holes in the respective sides of the block. The block is curved at the bottom in order to provide for tilting movement of the motor member in the curved socket 25 of the base. The block is furthermore provided at the respective ends with upright grooves 28, either one of which is adapted to be alined with the conductor opening 17 of the motor casing. The block 26 is reversible end for end between the lugs 15 and a groove of the block will register with the conductor opening of the casing regardless of which end of the block is disposed toward the casing section 13ᶜ. This makes for a very quick and convenient assemblage, and it will be understood that the block 26 mounted between the lugs 15 forms a very desirable means for adjustably mounting the motor upon the base 24 as shown in Fig. 2. In the latter view, the motor shaft is shown equipped with a detachable drive pulley 29.

In some cases, it is desirable to use a supporting handle in connection with the motor member. Such an arrangement is shown in Fig. 5 where the block 26 is shown in place between lugs 15, and a handle 18 is used, which is preferably secured to the block by a screw 30 rigidly fastened to the upper end of this handle and screwed into a threaded socket 31 in the lower central part of the block 26. It will be readily understood from Fig. 5 that when the handle is screwed to the block, the conductors can pass laterally to the motor through the grooves 28 which communicate with the conductor opening 17. By taking off the handle 18, the motor member may again be used in connection with the base 24.

Various modifications of the construction may be made without departing from the scope of the invention as defined in the claims.

I do not claim broadly herein the combination in an electric motor of a motor member having a lug, a base member having a socket in which said lug rests by gravity, said lug and socket being so formed and located as to permit a tilting movement of the motor member in a vertical plane, and means for clamping the lug frictionally in said socket to hold the motor member in the adjusted position, as claimed in my application, Serial No. 203,974, filed November 26, 1917, hereinbefore identified.

What I claim is:

1. In an electric motor provided with a casing, supporting lugs formed upon said casing, a block mounted between said lugs, securing means extending through said lugs into said block, a base for said motor, and means independent of said securing means for adjustably mounting said block upon said base.

2. In an electric motor provided with a casing, a block detachably secured to said casing and having a curved lower face, a base for said motor having a curved socket formed therein to adjustably receive said block, and a set screw having the inner end extending from said base into said socket to clamp said block therein.

3. In an electric motor provided with a casing, supporting lugs formed upon said casing, a block detachably mounted between said lugs, a supporting member detachably secured to said block, and threaded means for securing said block to said supporting member.

4. In an electric motor provided with a casing, supporting lugs formed upon said casing, a block detachably mounted between said lugs, said block having means to prevent motion between itself and said lugs and means to be detachably secured to a support, said securing means independent of the mounting between lugs and block.

5. In an electric motor provided with a casing, said casing having lugs thereon, a block detachably, yet secured against motion, mounted therebetween, a base having means to be detachably and adjustably secured to said block, said securing means acting against the side of said block.

6. In an electric motor having a casing with lugs formed thereon, a block constructed with means to be detachably, yet securely, fastened between said lugs and means, independent of the lug fastening means, to be detachably secured to a support, said securing means being located in the underside of said block.

7. In an electric motor, a motor casing having a pair of lugs integral therewith, a block detachably secured between and attached to said lugs, and means for connecting said block to said lugs, said block retained against rotation between the lugs when so connected, and adapted to be detachably connected to various supports.

8. An electric motor having means to connect same to a plurality of supports, comprising a motor casing with lugs formed thereon, a block detachably mounted between said lugs, said block being adapted to seat into a socket to be clamped therein and to screw upon a threaded stud to be secured thereto.

9. In an electric motor, a casing, lugs formed on said casing and integral therewith, a block mounted between said lugs, said block having a convex surface upon the bottom thereof, a base having an arc-shaped socket to receive the block whereby the convex surface of the block may ride in the arc-shaped socket to allow pivoted adjustment of the motor in relation to the base, and means to secure said parts in various positions.

10. An electric motor having a casing with lugs depending therefrom and integral therewith, a base for said motor having a concave socket therein, means for detachably and adjustably connecting said motor with said base comprising a block adapted to be interposed between said lugs, and to seat in said socket being supported therein, and means to clamp said block within said socket.

In witness whereof I have hereunto set my hand this 4th day of March, 1919.

ALFRED C. GILBERT.